US010266175B2

(12) United States Patent
Miller et al.

(10) Patent No.: US 10,266,175 B2
(45) Date of Patent: Apr. 23, 2019

(54) VEHICLE COLLISION AVOIDANCE

(71) Applicant: Ford Global Technologies, LLC, Dearborn, MI (US)

(72) Inventors: Alex Maurice Miller, Canton, MI (US); Roger Arnold Trombley, Ann Arbor, MI (US); Kun Deng, Ann Arbor, MI (US); Ahsan Qamar, Canton, MI (US); Sarra Awad Yako, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 120 days.

(21) Appl. No.: 15/169,428

(22) Filed: May 31, 2016

(65) Prior Publication Data
US 2017/0341641 A1 Nov. 30, 2017

(51) Int. Cl.
| | |
|---|---|
| *B60W 10/20* | (2006.01) |
| *B60W 30/09* | (2012.01) |
| *B62D 6/00* | (2006.01) |
| *B60T 7/22* | (2006.01) |
| *B62D 15/02* | (2006.01) |
| *G08G 1/16* | (2006.01) |

(52) U.S. Cl.
CPC .............. *B60W 30/09* (2013.01); *B60T 7/22* (2013.01); *B62D 15/0265* (2013.01); *G08G 1/164* (2013.01); *G08G 1/165* (2013.01); *G08G 1/166* (2013.01); *B60T 2201/024* (2013.01)

(58) Field of Classification Search
CPC ...... B60W 30/08; B60W 30/09; B60W 10/20; G07C 5/085; B60T 7/22; B62D 15/0265; B62D 6/00; G08G 1/164; G08G 1/165; G08G 1/166
See application file for complete search history.

(56) References Cited

U.S. PATENT DOCUMENTS

| | | | |
|---|---|---|---|
| 6,067,031 A | 5/2000 | Janky et al. | |
| 6,084,508 A | 7/2000 | Mai et al. | |
| 7,145,441 B2 | 12/2006 | Knoop et al. | |
| 7,209,051 B2 | 4/2007 | Shankwitz et al. | |
| 7,505,850 B2 | 3/2009 | Kim et al. | |

(Continued)

FOREIGN PATENT DOCUMENTS

| | | |
|---|---|---|
| CN | 1766232 A | 5/2006 |
| CN | 202057015 U | 11/2011 |

(Continued)

OTHER PUBLICATIONS

Non-Final Office Action dated Aug. 28, 2017 in U.S. Appl. No. 15/171,287.

(Continued)

*Primary Examiner* — Adam D Tissot
*Assistant Examiner* — Aaron C Smith
(74) *Attorney, Agent, or Firm* — Frank A. MacKenzie; Bejin Bieneman PLC

(57) ABSTRACT

A plurality of targets are identified. A path for each target is predicted. A threat number for each target is determined based at least in part on the predicted paths. The threat number indicates a probability of a collision between the respective target and a host vehicle. One or more vehicle subsystems in the host vehicle is actuated based on the threat numbers.

20 Claims, 4 Drawing Sheets

(56) References Cited

U.S. PATENT DOCUMENTS

| | | |
|---|---|---|
| 8,466,807 B2 | 6/2013 | Mudalige |
| 8,577,550 B2 | 11/2013 | Lu et al. |
| 8,751,142 B2 | 6/2014 | Kim |
| 8,831,870 B2 | 9/2014 | Whikehart et al. |
| 8,930,105 B2 | 1/2015 | Cetinkaya |
| 9,150,199 B2 | 10/2015 | Schleicher et al. |
| 2003/0016143 A1 | 1/2003 | Ghazarian |
| 2006/0284481 A1 | 12/2006 | Yone |
| 2007/0005609 A1 | 1/2007 | Breed |
| 2007/0276600 A1 | 11/2007 | King et al. |
| 2008/0114530 A1 | 5/2008 | Petrisor et al. |
| 2010/0228419 A1 | 9/2010 | Lee et al. |
| 2011/0298603 A1 | 12/2011 | King et al. |
| 2012/0095646 A1 | 4/2012 | Ghazarian |
| 2013/0026916 A1 | 1/2013 | Imaeda |
| 2013/0116859 A1* | 5/2013 | Ihlenburg ............... G06F 17/00 701/2 |
| 2014/0303882 A1 | 10/2014 | Jang et al. |
| 2014/0347207 A1 | 11/2014 | Zeng et al. |
| 2015/0210256 A1 | 7/2015 | Yamashsita et al. |
| 2015/0210280 A1* | 7/2015 | Agnew ............... B60W 30/09 701/48 |
| 2016/0052515 A1* | 2/2016 | Choi ............... B60W 30/0953 701/1 |
| 2016/0194000 A1 | 7/2016 | Taki et al. |
| 2016/0368492 A1 | 12/2016 | Al-Stouhi |
| 2017/0113665 A1 | 4/2017 | Mudalige et al. |
| 2017/0120906 A1 | 5/2017 | Penilla et al. |

FOREIGN PATENT DOCUMENTS

| | | |
|---|---|---|
| CN | 202868581 U | 4/2013 |
| CN | 103871272 A | 6/2014 |
| CN | 103898822 A | 7/2014 |
| CN | 104134370 A | 11/2014 |
| DE | 102007015032 A1 | 1/2008 |
| GB | 2498438 A | 7/2013 |
| JP | H11175896 A | 7/1999 |
| JP | 2005173703 A | 6/2005 |
| JP | 200964331 A | 3/2009 |
| JP | 2009087372 A | 4/2009 |
| JP | 2009146219 A | 7/2009 |
| JP | 20146609 A | 1/2014 |
| KR | 101414571 | 6/2014 |
| WO | 2010110109 A1 | 9/2010 |
| WO | 2011156621 A2 | 12/2011 |
| WO | 2015136958 A1 | 9/2015 |

OTHER PUBLICATIONS

UKIPO Search Report dated Nov. 23, 2017 for Application No. GB1708570.5 (4 pages).

* cited by examiner

VEHICLE COLLISION AVOIDANCE

BACKGROUND

Vehicle collisions often occur at intersections. Collision avoidance systems use sensors to detect a target that can collide with a host vehicle in the intersection. The systems can detect a target object position and speed to determine a probability of a collision with the host vehicle. However, the intersection can have more than one target to avoid. Current collision avoidance systems are lacking with respect to intersections having more than one target.

DETAILED DESCRIPTION

A computing device in a host vehicle identifies a plurality of targets in an intersection. Based on the target speed, direction of travel, and position, the computing device determines a predicted path of travel for each target. The computing device determines a threat number for each target based on the predicted path. The threat number indicates a probability of a collision between the target and the host vehicle. Based on the respective threat numbers, the computing device actuates one or more vehicle subsystems to slow and/or stop the host vehicle at a stopping point to avoid targets with threat numbers above a threat number threshold. By detecting more than one target and developing threat numbers for each target as the targets move in the intersection, the host vehicle can avoid more than one target having a probability of a collision in the intersection. Thus, the host vehicle can avoid collisions in intersections with a plurality of targets.

Figure 1:
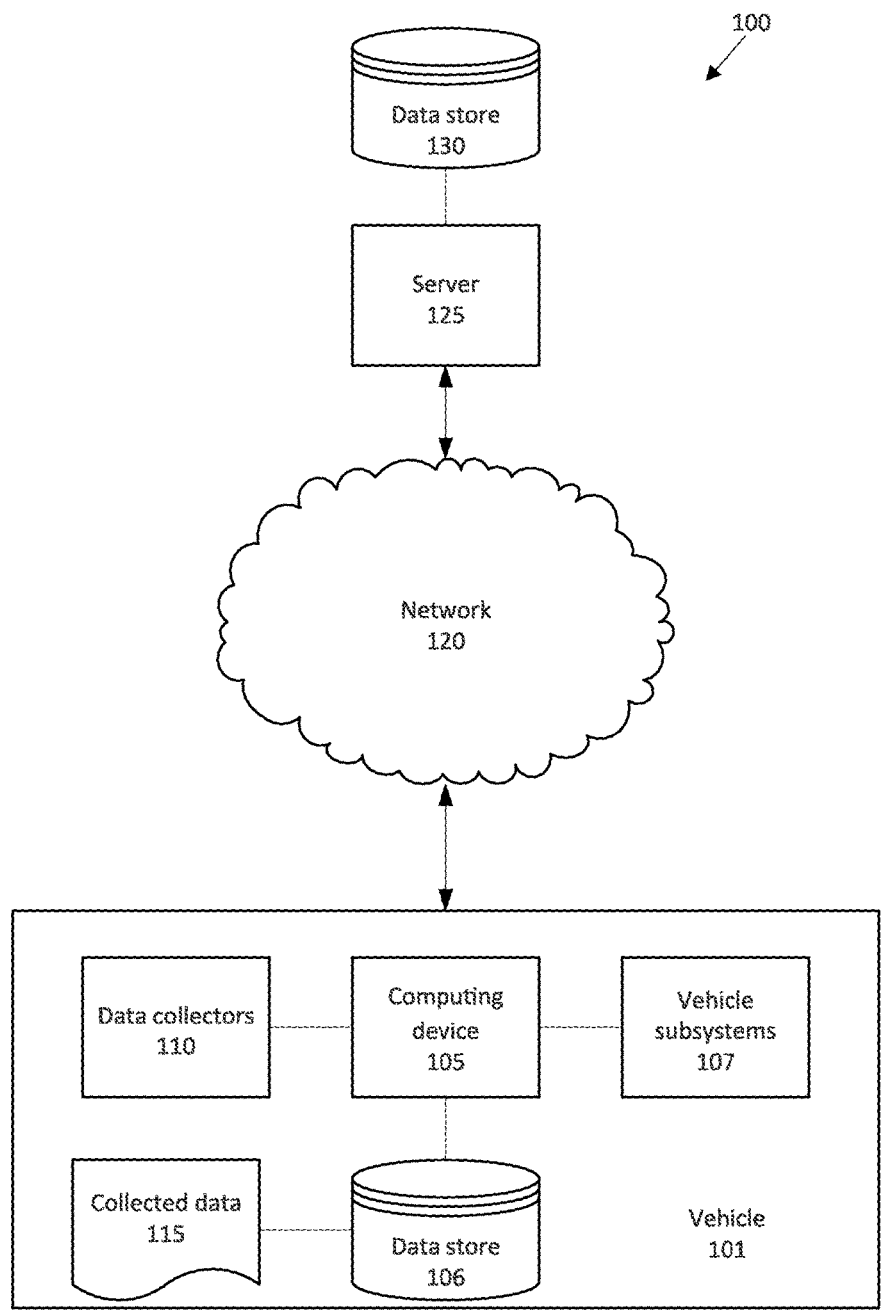
FIG. 1 is a block diagram of a collision avoidance system.

FIG. 1 illustrates a system 100 for detection of an intersection 135 and collision avoidance for a host vehicle 101. The word "host" applied herein to the vehicle 101 means that the vehicle 101 is the vehicle from whose perspective collision avoidance is being performed, e.g., the vehicle 101 including a computer 105, data collectors 110, etc., as disclosed herein that operate as described herein to perform collision avoidance.

Unless expressly indicated otherwise, in this disclosure an "intersection" is defined as a location where current or potential future paths of two or more vehicles 101 cross. Thus, an intersection 135 could be at any location on a surface where two or more vehicles 101 could collide, e.g., a road, a driveway, a parking lot, an entrance to a public road, driving paths, etc. Accordingly, an intersection 135 is determined by identifying a location where two or more vehicles 101 may meet, i.e., collide. Such determination uses potential future trajectories of a host vehicle 101 as well as nearby other vehicles 101 and/or other objects, i.e., targets 140.

A computing device 105 in the vehicle 101 is programmed to receive collected data 115 from one or more data collectors 110, e.g., vehicle 101 sensors, concerning various data 115 related to the vehicle 101. For example, vehicle 101 data may include location of the vehicle 101, location of a target 140, etc. Location data 115 may be in a known form, e.g., geo coordinates (latitude and longitude coordinates) obtained via a navigation system, as is known, that uses the Global Position System (GPS). Further examples of data 115 can include measurements of vehicle 101 systems and components, e.g., a vehicle 101 velocity, a vehicle 101 trajectory, etc.

The computing device 105 is generally programmed for communications on a vehicle network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including data collectors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the data collectors 110.

The vehicle 101 may include a plurality of subsystems 107. The subsystems 107 control vehicle 101 components, e.g., a vehicle seat, mirror, tiltable and/or telescoping steering wheel, etc. The subsystems 107 include, e.g., a steering subsystem, a brake subsystem, a propulsion subsystem (e.g., a powertrain including an internal combustion engine and/or electric motor), etc. The computing device 105 may actuate the subsystems 107 to control the vehicle 101 components, e.g., to move the vehicle 101 to a stop, to avoid targets, etc.

Data collectors 110 may include a variety of devices. For example, various controllers in a vehicle may operate as data collectors 110 to provide data 115 via the vehicle 101 network or bus, e.g., data 115 relating to vehicle speed, acceleration, position, system and/or component functionality, etc. Further, other data collectors 110 could include cameras, motion detectors, etc., i.e., data collectors 110 to provide data 115 for evaluating location of a target 140, projecting a path 145 of a target 140, etc.

Collected data 115 may include a variety of data collected in a vehicle 101. Examples of collected data 115 are provided above. Moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

Figure 2:
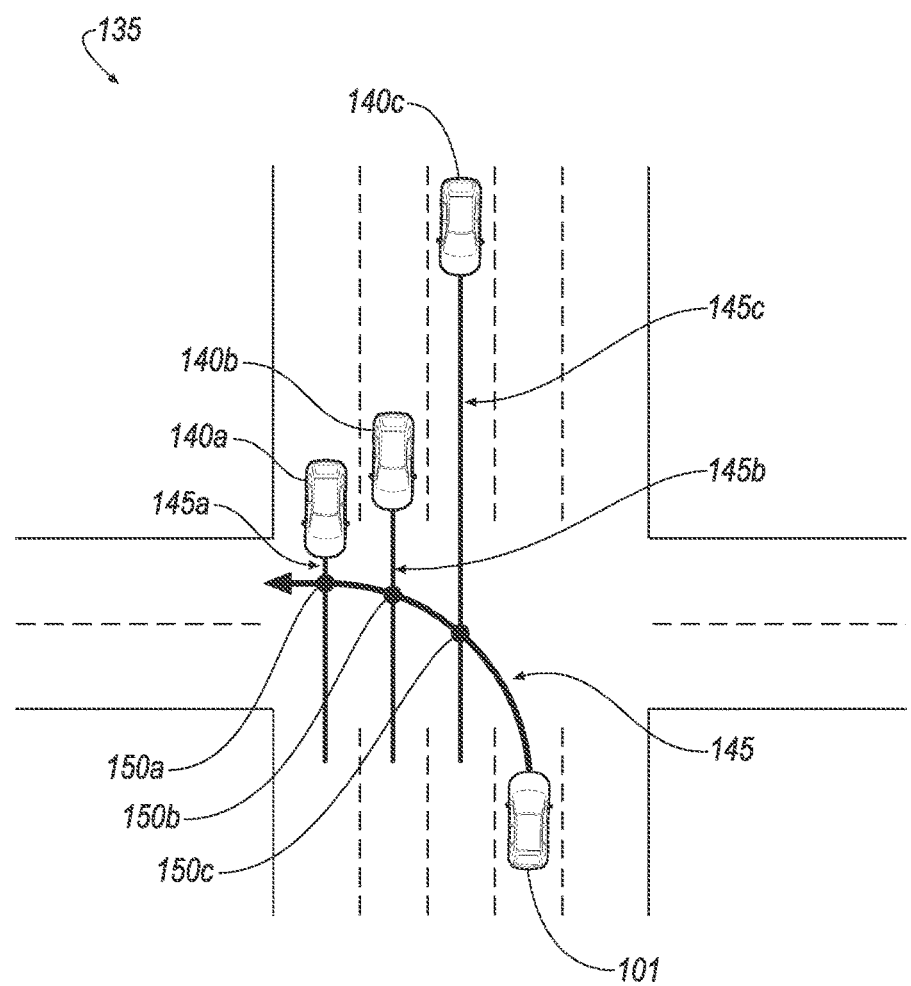
FIG. 2 illustrates an example intersection between a host vehicle and a plurality of target objects.

FIG. 2 illustrates an example intersection 135 between a host vehicle 101 and a plurality of targets 140. The intersection 135 in FIG. 2 is a multi-lane roadway crossing with one host vehicle 101 and three target objects (sometimes referred to for convenience simply as "targets") 140a, 140b, 140c. The host vehicle 101 of FIG. 2 is shown about to make a left-hand turn, which would move the host vehicle 101 into the trajectories of the targets 140a, 140b, 140c. A host vehicle 101 making a left-hand turn on a 2-way right-hand driving roadway will move the host vehicle 101 across lanes where other vehicles 101 move opposite to the direction of the host vehicle 101 before making the left-hand turn. That is, the host vehicle 101 in a left-hand turn has to cross lanes where targets 140 move toward the host vehicle 101 in the intersection 135, increasing a probability of a collision.

The target 140 is an object that has a possibility of a collision with the host vehicle 101. For example, the target 140 may be another vehicle 101, i.e., a target vehicle 140, having a target 140 speed, a target 140 direction of travel, and a target 140 distance from the host vehicle 101. The example of FIG. 2 includes three target vehicles 140a, 140b, 140c. As described above, the target vehicles 140a, 140b, 140c are moving in a direction opposite to the direction that the host vehicle 101 is moving prior to the host vehicle 101 making the left-hand turn. If the target vehicles 140a, 140b, 140c continue in their direction of travel, i.e., straight, then the host vehicle 101 will cross in front of the targets 140a, 140b, 140c as the host vehicle 101 makes the left-hand turn. The target may be another moving object, e.g., a pedestrian, a bicycle, etc. The target 140 may alternatively be a stationary object, e.g., a road sign, a lamp post, a highway median wall, etc.

The computing device 105 determines a path 145 for each target 140. The path 145 is a predicted line of travel that the target 140 will follow based on one or more elements of the target trajectory, e.g., the target 140 speed, the target 140 direction of travel, the target 140 position, etc. That is, the path 145 can be represented as a strip having two edges separated by a distance that is the width of the target 140, e.g., 2 meters, that extends along a line that the target 140 is predicted to travel. In the example of FIG. 2, the computing device 105 determines a target path 145a for the target 140a, a target path 145b for the target 140b, and a target path 145c for the target 140c. The computing device 105 also predicts a host path 145 for the host vehicle 101 based on, e.g., a host vehicle 101 speed, a host vehicle 101 direction of travel, a host vehicle 101 position, etc. As used herein, a "position" of the target 140 and/or the host vehicle 101 refers to a location specified with reference to coordinates in a coordinate system, e.g., geo-coordinates, a set of coordinates on a predetermined X-Y-Z Cartesian grid, etc. The computing device 105 is programmed to actuate vehicle subsystems 107 to move the host vehicle 101 to avoid at least one of the target paths 145a, 145b, 145c. In the example of FIG. 2, the host path 145 indicates that the host vehicle 101 is turning left in the intersection 135, and the target paths 145a, 145b, 145c indicate that the respective targets 140a, 140b, 140c are moving straight in the intersection 135.

The intersection 135 includes at least one crossing point 150. The crossing point 150 is the area where two paths 145 intersect, and can indicate a potential collision. That is, the path 145 includes a plurality of "location points," i.e., points that each specify a location. The computing device 105 compares location points of the target path 145 to the location points of the host path 145 and finds the location points that are within a predetermined range that the location points indicate that the target path 145 and the host path 145 intersect. The area where the target path 145 and the host path 145 intersect is defined as a crossing point 150. That is, at the crossing point 150, the host vehicle 101 and the target 140 share the same location, and if the host vehicle 101 and the target 140 are at the crossing point 150 at the same time, the host vehicle 101 and the target 140 can collide.

The crossing point 150 can indicate a potential collision between the target 140 and the host vehicle 101. In the example of FIG. 2, because the host vehicle 101 is making a left-hand turn across the lanes in which the target vehicles 140a, 140b, 140c are moving, the host path 145 will cross the target paths 145a, 145b, 145c. Each target path 145a, 145b, 145c has a respective crossing point 150a, 150b, 150c indicating the crossing of the target paths 145a, 145b, 145c and the host path 145. Thus, the crossing points 150a, 150b, 150c indicate positions where there is a possibility of a collision between the host vehicle 101 and respective targets 140a, 140b, 140c.

The computing device 105 determines, according to known techniques, threat numbers for each of the targets 140 based on the paths 145 and the crossing points 150. The threat number for a target 140 indicates a probability of a collision between the target 140 and the host vehicle 101. The threat number can be determined based on at least one of a host vehicle 101 position, speed, direction of travel, ability to steer, a target 140 position, speed, direction of travel, ability to steer, etc. That is, the threat number indicates the likelihood that the target 140 and the host vehicle 101 will collide at the crossing point 150, and whether either of the target 140 and the host vehicle 101 can avoid the collision. The threat number is typically a value between 0 and 1, with numbers closer to 1 indicating a higher probability of a collision. For example, the threat number may be a ratio of a required deceleration to stop the target 140 prior to entering the host vehicle path 145 (i.e., a "zero-range" deceleration) to a predetermined maximum deceleration of the target 140. Thus, if a first target 140, e.g., the target 140a, has a zero-range deceleration higher than that of a second target 140, e.g., the target 140b, the threat number of the first target 140 would be higher than the threat number of the second target 140. The computing device 105 would thus determine that the first target 140 has a higher probability of colliding with the host vehicle 101 than the second target 140 would. The computing device 105 uses the threat numbers to determine specific adjustments to vehicle subsystems 107 in the host vehicle 101 to avoid the targets 140 with threat numbers above a threat number threshold to avoid collisions.

Based on the threat numbers, the computing device 105 can determine a stopping point for the host vehicle 101 to avoid a collision with the targets 140. An "stopping point" is a part of the host path 145 where the host vehicle 101 can slow and/or stop to avoid targets 140 having threat numbers above the threat number threshold until the threat numbers for those targets 140 fall below the threat number threshold. That is, the indicates the parts of the host path 145 of the host vehicle 101 in which the host vehicle 101 can slow and/or stop to avoid a collision with the targets 140. The stopping point can be determined as a part of the host path 145 that is more than a predetermined distance from the edges of the target paths 145, e.g., 2 meters.

As shown in FIG. 2, the intersection 135 includes three crossing points 150a, 150b, 150c. Based on the threat numbers for the targets 140a, 140b, 140c, the host vehicle 101 can slow and/or stop along the host path 145 to avoid collisions with the targets 140a, 140b, 140c with threat numbers above a threat number threshold. For example, if the threat numbers for the target 140a is above the threat number threshold, but the threat numbers for the targets 140b, 140c are below the threat number threshold, the stopping point can include one of the crossing points 150b, 150c and exclude the crossing point 150a. Because the threat numbers for the targets 140b, 140c are below the threat number threshold, the computing device 105 determines that the probability of a collision between the host vehicle 101 and the targets 140b, 140c allows the computing device 105 to slow and/or stop the host vehicle 101 at one of the crossing points 150b, 150c until the threat numbers of the target 140a falls below the threat number threshold.

However, even if the threat number for a target 140 is currently below the threat number threshold, when the host vehicle 101 reaches the stopping point, the threat numbers for other targets 140 can increase above the threat number threshold. For example, because the threat number of the target 140a is above the threat number threshold, the computing device 105 can determine the stopping point to be away from the target path 145a, e.g., the crossing point 150b. If the host vehicle 101 stays at the crossing point 150b, the host vehicle 101 will be in the target path 145b, and the threat number of the target 140b will increase. If the threat number of the target 140b increases above the threat number threshold before the target 140a passes the crossing point 150a, allowing the host vehicle 101 to move from the crossing point 150b, the target 140b may collide with the host vehicle 101.

To account for a rising threat number of other targets 140, the computing device 105 can determine the threat numbers for targets 140 when the host vehicle 101 is at the initially determined stopping point, and can recalculate the stopping point to avoid targets 140 that will have threat numbers above the threat number threshold while the host vehicle 101 is at the initially determined stopping point. To continue with the above example, the computing device 105 can determine that the threat number of the target 140b will rise above the threat number threshold while the host vehicle 101 is at the crossing point 150b, which is the stopping point that the computing device 105 initially determined to avoid the target 140a. Thus, the computing device can determine a new stopping point to avoid the path 145b of the target 140b. The computing device 105 can continue to recalculate the stopping point until all targets 140 having threat numbers above the threat number threshold while the host vehicle 101 is in the intersection 135 are accounted for.

There may be targets 140 where the threat number does not rise above the threat number threshold while the host vehicle 101 is in the intersection 135. For example, the target 140c may be a distance from the crossing point 150c that is far enough from the host vehicle 101 that the host vehicle 101 can stop a predetermined distance away from the target path 145b, wait until the targets 140a, 140b clear the intersection 135, and then move along the host path 145 before the target 140c reaches the crossing point 150c. That is, in this example, the threat number for the target 140c indicates that there would be a low probability of a collision at the crossing point 150c even when the host vehicle 101 is stopped at the crossing point 150c until the targets 140a, 140b pass the crossing points 150a, 150b. After the targets 140a, 140b pass the crossing points 150a, 150b, the host vehicle 101 can continue along the host path 145, avoiding the target 140c. The crossing point 150c can thus be part of the stopping point. Furthermore, the target 140c can include a computing device 105 that, upon detecting the host vehicle 101 at the crossing point 150c, actuates target 140c vehicle subsystems 107 to slow and/or stop the target 140c before reaching the crossing point 150c when the host vehicle 101 is stopped at the crossing point 150c.

Figure 3:
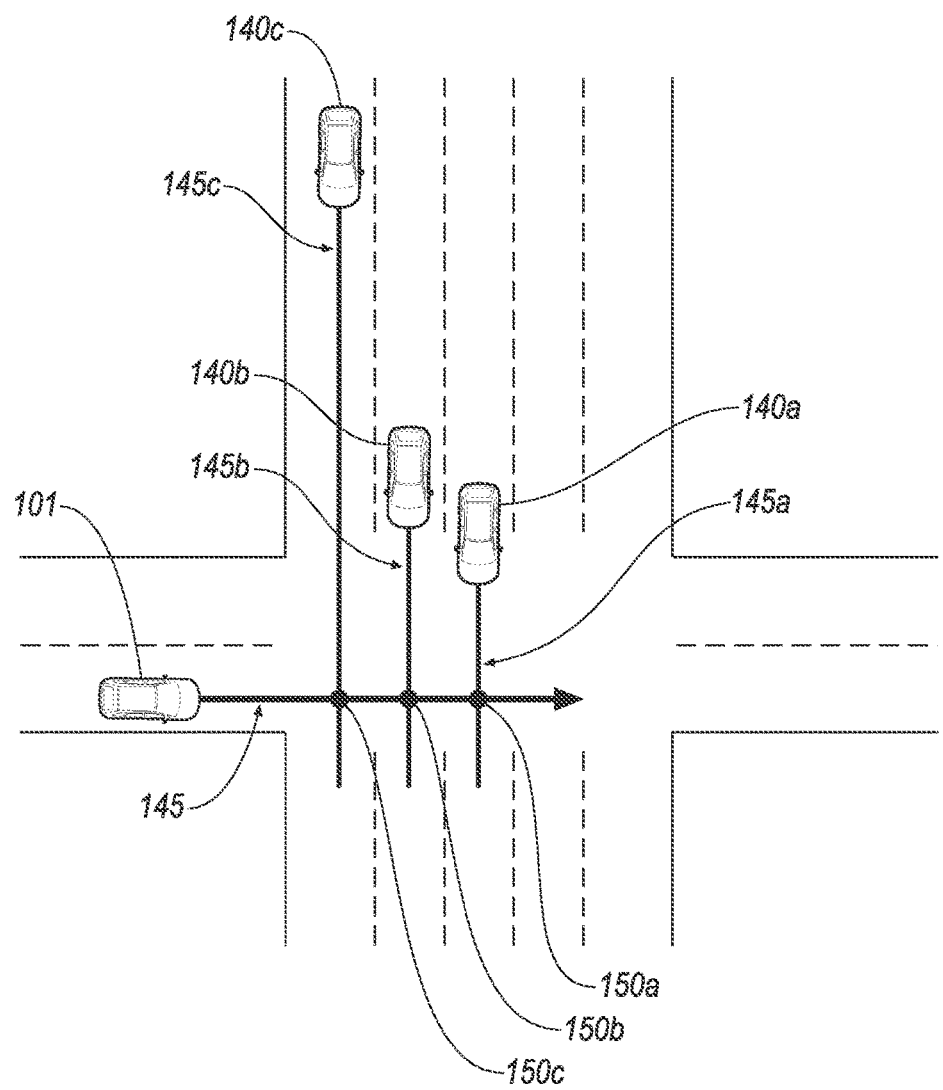
FIG. 3 illustrates another example intersection between the host vehicle and the plurality of target objects.

FIG. 3 illustrates another example intersection 135. The intersection 135 includes a host vehicle 101 and three targets 140a, 140b, 140c. The host vehicle 101 trajectory here is substantially perpendicular to the trajectories of the targets 140a, 140b, 140c. That is, a host path 145 is straight from left to right, while target paths 145a, 145b, 145c are straight from top to bottom, i.e., neither the host vehicle 101 nor the targets 140a, 140b, 140c substantially deviate from a straight trajectory. The targets 140a, 140b, 140c thus move laterally relative to the host vehicle 101, in this example laterally with respect to a roadway on which the host vehicle is travelling. The host path 145 and the target paths 145a, 145b, 145c intersect at respective crossing points 150a, 150b, 150c.

As described above for FIG. 2, the computing device 105 determines threat numbers for the targets 140a, 140b, 140c. Based on the threat numbers, the computing device 105 determines a stopping point for the host vehicle 101 along the host path 145. For example, if the threat numbers for the target 140a is initially above the threat number threshold and the threat number for the target 140b will rise above the threat number threshold based on the stopping point determined to avoid the target 140a, the computing device 105 can determine the stopping point to exclude the crossing points 150a, 150b, preventing the host vehicle 101 from stopping at the crossing points 150a, 150b. The computing device 105 then actuates the vehicle subsystems 107 to slow and/or stop the host vehicle 101 at the stopping point to avoid the targets 140a, 140b. Because the threat number for the target 140c is below the threat number threshold and will remain below the threat number threshold until the host vehicle 101 leaves the intersection 135, the computing device can determine the stopping point to be in the path 145c of the target 140c, e.g., the crossing point 150c. Thus, the host vehicle 101 can avoid collisions with a plurality of targets 140 moving laterally relative to the host vehicle 101 in the intersection 135.

Figure 4:
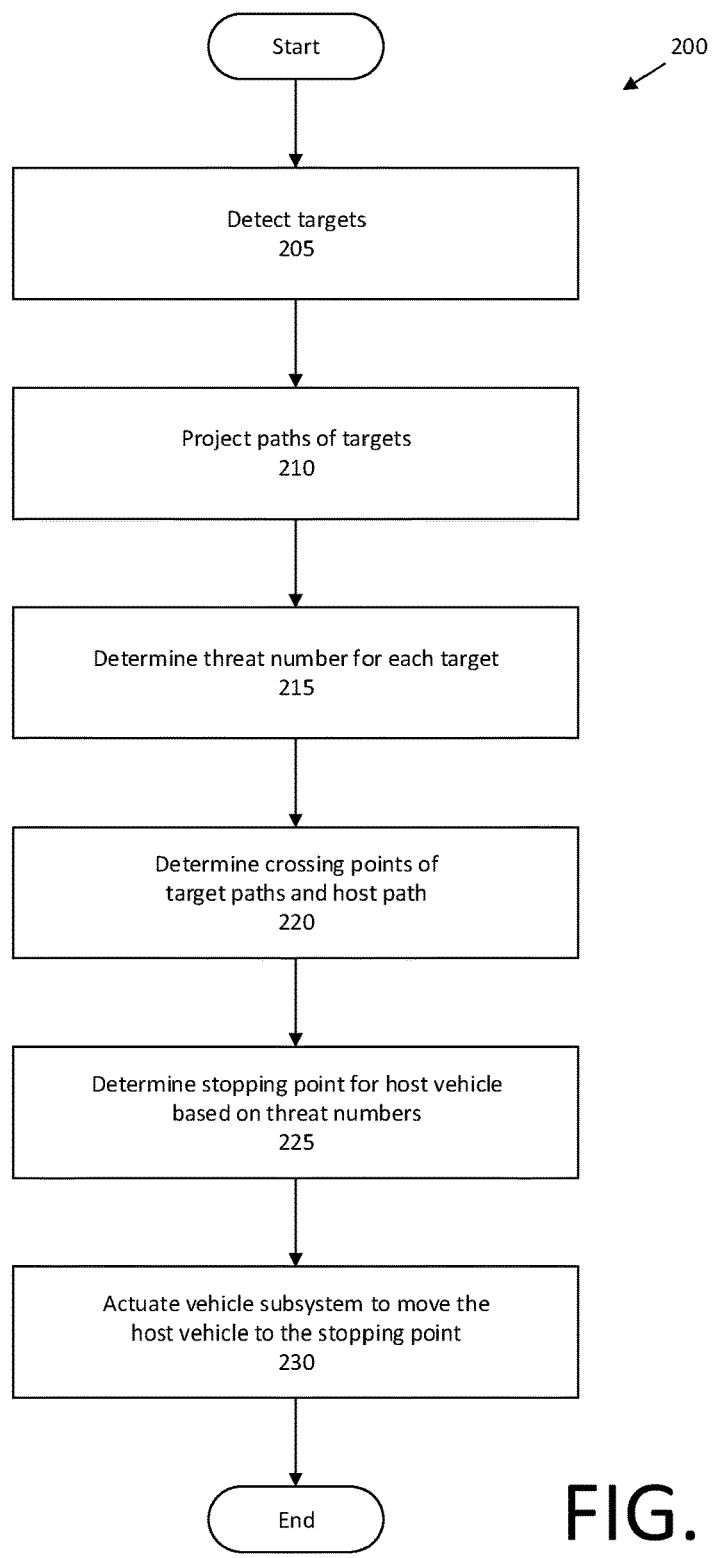
FIG. 4 illustrates of process for avoiding a collision at an intersection with the system of FIG. 1.

FIG. 4 illustrates a process 200 for operating the vehicle 101 in the intersection 135. The process 200 begins in a block 205, in which the computing device 105 collects data 115 and detects more than one target 140, typically using one or more known mechanisms. To take one example, the computing device 105 can collect radar data 115 that indicate more than one target vehicle 140, a speed for each target vehicle 140, a direction of travel for each target vehicle 140, etc. The target 140 can be, e.g., a vehicle 101, a pedestrian, a road sign, etc. As described above, the examples of FIGS. 2 and 3 show the computing device 105 detecting three targets 140a, 140b, 140c.

Next, in a block 210, the computing device 105 projects a path 145 for each target 140 and for the host vehicle 101. The path 145 predicts the motion of the target 140, and indicates a probability of a collision between the host vehicle 101 and the target 140. The path 140 can be predicted based on at least one of, e.g., a target speed, a target direction of travel, a target position, etc. For example, the data 115 can indicate a speed for each target vehicle 140, a direction of travel for each target vehicle 140, and a position for each target vehicle 140. Based on the data 115, the computing device 105 can predict the path 145 that each target vehicle 140 and the host vehicle 101 will follow. In the example of FIGS. 2 and 3, the target vehicles 140a, 140b, 140c are each moving in their respective lanes such that the paths 145a, 145b, 145c indicate that the target vehicles 140a, 140b, 140c will move straight forward relative to the roadway lanes.

Next, in a block 215, the computing device 105 determines a threat number for each target 140. As described above, the threat number indicates a probability of a collision between the target 140 and the host vehicle 101. The threat number is based at least in part on the projected path 145 of the target 140 and the projected host path 145 of the host vehicle 101. In the example of FIG. 2, the threat number for the target 140a may be higher than the threat number for the target 140c because the target 140a is closer to the host vehicle 101 than the target 140c is to the host vehicle 101.

Next, in a block 220, the computing device 105 compares the paths 145 of the targets 140 and the host vehicle 101, and determines crossing points 150 where the paths 145 of the targets 140 and the path 145 of the host vehicle 101 cross. That is, the host and target paths 145 include location information for each point along the paths 145. The computing device 105 can identify specific points along the target path 145 that are within a predetermined range of specific points along the host path 145 such that the host and target paths 145 intersect. If the target 140 and the host vehicle 101 are at one of the crossing points 150 at the same time, the host vehicle 101 and the target 140 will collide. The crossing points 150 for targets with threat numbers above a threat number threshold indicate locations the host vehicle 101 should avoid to prevent a collision.

Next, in a block 225, the computing device 105 determines an stopping point for the host vehicle 101. The stopping point indicates the part of the path 145 of the host vehicle 101 where the host vehicle 101 can slow and/or stop to avoid a collision with the targets 140. As described above, the stopping point excludes the crossing points 150 for targets 140 with threat numbers above the threat number threshold, i.e., the stopping point indicates a position where the host vehicle 101 avoids the targets 140 with threat numbers above the threat number threshold.

Next, in a block 230, the computing device 105 actuates vehicle subsystems 107 to move the host vehicle 101 to the stopping point. For example, the computing device 105 can actuate a brake subsystem 107 to stop the host vehicle 101 and allow the targets 140 to pass. In another example, the computing device 105 can actuate a steering subsystem 107 to move the host path 145 of the host vehicle 101 away from the paths 145 of the targets 140. In yet another example, the computing device 101 can actuate a propulsion subsystem 107 to move the host vehicle 101 along the host path 145 past the crossing points 150 before the targets 140 reach the crossing points 150. Following the block 230, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:

identify a plurality of target objects;
predict respective paths for each target object based at least in part on a respective acceleration of each target object;
determine respective threat numbers for each target based at least in part on the predicted paths, each threat number indicating a probability of a collision between the respective target and a host vehicle;
identify a respective crossing point between each respective path and a projected path of the host vehicle;
identify a stopping point along the projected path of the host vehicle based on the threat numbers, wherein the stopping point is a point along the projected path excluding crossing points of target objects having threat numbers above a threat number threshold and including crossing points of target objects having threat numbers below the threat number threshold; and
actuate one or more vehicle subsystems in the host vehicle to move the host vehicle forward to the stopping point and to stop the host vehicle at the stopping point.

2. The system of claim 1, wherein each threat number is further based at least in part on at least one of a target speed, a target position, a distance between the target and the host vehicle, and a projected path of the host vehicle.

3. The system of claim 1, wherein the vehicle subsystems include one or more of a brake subsystem, a steering subsystem, and a propulsion subsystem.

4. The system of claim 1, wherein instructions further include instructions to determine the targets with threat numbers that are above the threat number threshold and to actuate one or more vehicle subsystems to move the host vehicle away from the projected paths of the targets with threat numbers above the threat number threshold.

5. The system of claim 4, wherein the instructions further include instructions to actuate a brake subsystem to stop the host vehicle before crossing the projected paths of the targets with threat numbers above the threat number threshold.

6. The system of claim 4, wherein the instructions further include instructions to actuate a propulsion subsystem to move the host vehicle past the projected paths of the targets with threat numbers above the threat number threshold before the targets reach the projected path of the host vehicle.

7. The system of claim 1, wherein the instructions further include instructions to determine a part of a path of the host vehicle that is farther than a predetermined distance from the paths of the targets having threat numbers above the threat number threshold and to actuate one or more vehicle subsystems to stop the host vehicle in the part of the path of the host vehicle.

8. The system of claim 1, wherein the instructions further include instructions to actuate one or more vehicle subsystems to avoid the crossing points for targets with threat numbers above the threat number threshold.

9. The system of claim 8, wherein the instructions further include instructions to stop the host vehicle in the projected host path until the targets pass the crossing points.

10. The system of claim 8, wherein the instructions further include instructions to slow the host vehicle in the projected host path until the targets pass the crossing points.

11. A method, comprising:
identifying a plurality of targets;
predicting respective paths for each target object based at least in part on a respective acceleration of each target object;
determining respective threat numbers for each target based at least in part on the predicted paths, each threat number indicating a probability of a collision between the respective target and a host vehicle;
identifying a respective crossing point between each respective path and a projected path of the host vehicle;
identifying a stopping point along the projected path of the host vehicle based on the threat numbers, wherein the stopping point is a point along the projected path excluding crossing points of target objects having threat numbers above a threat number threshold and including crossing points of target objects having threat numbers below the threat number threshold; and
actuating one or more vehicle subsystems in the host vehicle to move the host vehicle forward to the stopping point and to stop the host vehicle at the stopping point.

12. The method of claim 11, wherein each threat number is further based on at least one of a target speed, a target position, a distance between the target and the host vehicle, and a projected path of the host vehicle.

13. The method of claim 11, wherein the vehicle subsystems include a brake subsystem, a steering subsystem, and a propulsion subsystem.

14. The method of claim 11, further comprising determining the targets with threat numbers that are above the threat number threshold and actuating one or more vehicle subsystems to move the host vehicle away from the projected paths of the targets with threat numbers above the threat number threshold.

15. The method of claim 14, further comprising actuating a brake subsystem to stop the host vehicle before crossing the projected paths of the targets with threat numbers above the threat number threshold.

16. The method of claim 14, further comprising actuating a propulsion subsystem to move the host vehicle past the projected paths of the targets with threat numbers above the threat number threshold before the targets reach the projected path of the host vehicle.

17. The method of claim 11, further comprising determining a part of a path of the host vehicle that is farther than a predetermined distance from the paths of the targets having threat numbers above the threat number threshold and actuating one or more vehicle subsystems to stop the host vehicle in the part of the path of the host vehicle.

18. The method of claim 11, further comprising actuating one or more vehicle subsystems to avoid the crossing points for targets with threat numbers above the threat number threshold.

19. The method of claim 18, further comprising stopping the host vehicle in the projected host path until the targets pass the crossing points.

20. The method of claim 18, further comprising slowing the host vehicle in the projected host path until the targets pass the crossing points.

* * * * *